(12) United States Patent
Marinero et al.

(10) Patent No.: US 8,320,232 B1
(45) Date of Patent: Nov. 27, 2012

(54) PATTERNED PERPENDICULAR MAGNETIC RECORDING MEDIUM WITH MULTIPLE MAGNETIC LAYERS AND INTERLAYERS

(75) Inventors: Ernesto E. Marinero, Saratoga, CA (US); Dieter K. Weller, San Jose, CA (US); Brian R. York, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 13/188,384

(22) Filed: Jul. 21, 2011

(51) Int. Cl.
*G11B 3/70* (2006.01)
(52) U.S. Cl. ............ 369/288; 369/13.33; 428/828; 360/131
(58) Field of Classification Search ............ 369/13.35, 369/13.38–13.42, 13.53, 275.2, 283, 288, 369/275.3, 13.13, 13.33; 428/826–829; 360/131, 360/135
See application file for complete search history.

(56) References Cited

U.S. PATENT DOCUMENTS

| | | | | |
|---|---|---|---|---|
| 6,077,586 | A * | 6/2000 | Bian et al. | 428/828 |
| 7,713,389 | B2 | 5/2010 | Marinero | |
| 2004/0212933 | A1* | 10/2004 | Kim et al. | 360/324.11 |
| 2005/0214584 | A1* | 9/2005 | Takahashi et al. | 428/828 |
| 2006/0204791 | A1* | 9/2006 | Sakawaki et al. | 428/828.1 |
| 2006/0228586 | A1* | 10/2006 | Girt et al. | 428/828 |
| 2006/0269792 | A1* | 11/2006 | Fullerton et al. | 428/828 |
| 2007/0243418 | A1* | 10/2007 | Fullerton et al. | 428/828 |
| 2007/0292721 | A1* | 12/2007 | Berger et al. | 428/828.1 |
| 2008/0002296 | A1* | 1/2008 | Umeda et al. | 360/131 |
| 2008/0068937 | A1* | 3/2008 | Ogawa et al. | 369/13.17 |
| 2008/0254324 | A1* | 10/2008 | Berger et al. | 428/828 |
| 2008/0261078 | A1* | 10/2008 | Berger et al. | 428/800 |
| 2008/0292907 | A1 | 11/2008 | Berger et al. | |
| 2009/0213497 | A1 | 8/2009 | Ono et al. | |
| 2010/0143750 | A1* | 6/2010 | Sugimoto et al. | 428/828.1 |
| 2010/0239888 | A1 | 9/2010 | Uchiyama et al. | |
| 2010/0247965 | A1 | 9/2010 | Onoue | |
| 2010/0247969 | A1 | 9/2010 | Hauet et al. | |
| 2010/0297476 | A1 | 11/2010 | Sakai et al. | |

* cited by examiner

*Primary Examiner* — Thang Tran
(74) *Attorney, Agent, or Firm* — Thomas R. Berthold (57) ABSTRACT

A patterned perpendicular magnetic recording medium has discrete data islands that have first and second ferromagnetic layers (MAG1 and MAG2) with first and second nonmagnetic interlayers (IL1 and IL2) between MAG1 and MAG2. MAG1 and MAG2 may be similar CoPtCr alloys with similar thicknesses, with thicknesses of IL1 and IL2 that assure that MAG1 and MAG2 are strongly exchange coupled. Alternatively, MAG2 may be a "write assist" layer, for example a high-saturation magnetization, magnetically soft material in an exchange-spring structure, with IL1 being very thin so that IL2 functions as the coupling layer between MAG1 and the write-assist MAG2 layer. In an application for thermally-assisted recording (TAR), MAG2 may be the chemically-ordered equiatomic binary alloy FePt or CoPt based on the $L1_0$ phase, with high magneto-crystalline anisotropy ($K_u$).

18 Claims, 7 Drawing Sheets

PATTERNED PERPENDICULAR MAGNETIC RECORDING MEDIUM WITH MULTIPLE MAGNETIC LAYERS AND INTERLAYERS

BACKGROUND OF THE INVENTION

1. Field of the Invention

This invention relates generally to patterned perpendicular magnetic recording media, such as disks for use in magnetic recording hard disk drives, and more particularly to patterned disks with uniform data islands having improved magnetic recording properties.

2. Description of the Related Art

Magnetic recording hard disk drives with patterned magnetic recording media have been proposed to increase data density. In conventional continuous magnetic recording media, the magnetic recording layer is a continuous layer over the entire surface of the disk. In patterned media, also called bit-patterned media (BPM), the magnetic recording layer on the disk is patterned into small isolated data islands arranged in concentric data tracks. While BPM disks may be longitudinal magnetic recording disks, wherein the magnetization directions are parallel to or in the plane of the recording layer, perpendicular magnetic recording disks, wherein the magnetization directions are perpendicular to or out-of-the-plane of the recording layer, will likely be the choice for BPM because of the increased data density potential of perpendicular media. To produce the magnetic isolation of the patterned data islands, the magnetic moment of the spaces between the islands is destroyed or substantially reduced to render these spaces essentially nonmagnetic. Alternatively, the media may be fabricated so that there is no magnetic material in the spaces between the islands.

Nanoimprint lithography (NIL) has been proposed to form the desired pattern of islands on BPM disks. NIL is based on deforming an imprint resist layer by a master template or mold having the desired nano-scale pattern. The master template is made by a high-resolution lithography tool, such as an electron-beam tool. The substrate to be patterned may be a disk blank with the magnetic recording layer, and any required underlayers, formed on it as continuous layers. Then the substrate is spin-coated with the imprint resist, such as a thermoplastic polymer, like poly-methylmethacrylate (PMMA). The polymer is then heated above its glass transition temperature. At that temperature, the thermoplastic resist becomes viscous and the nano-scale pattern is reproduced on the imprint resist by imprinting from the template at a relatively high pressure. Once the polymer is cooled, the template is removed from the imprint resist leaving an inverse nano-scale pattern of recesses and spaces on the imprint resist. As an alternative to thermal curing of a thermoplastic polymer, a polymer curable by ultraviolet (UV) light, such as MonoMat available from Molecular Imprints, Inc., can be used as the imprint resist. The patterned imprint resist layer is then used as an etch mask to form the desired pattern of islands in the underlying magnetic recording layer.

It is important in BPM that there be uniformity in size and magnetic properties among the data islands. The switching field distribution (SFD), i.e., the island-to-island variation of the coercive field, needs to be narrow enough to insure exact addressability of individual islands without overwriting adjacent islands. Ideally the SFD width would be zero, meaning that all the bits would switch at the same write field strength. Variations in the size, shape and spacing of the islands, as well variations in the composition and crystallographic orientation of the magnetic material, increase the SFD.

It is also important to improve the writability of the individual data islands. It may desirable for the recording layer in the islands to be formed of at least two ferromagnetically exchange-coupled magnetic layers having different anisotropies to provide a graded anisotropy across the thickness of the recording layer. This type of graded-anisotropy recording layer compensates for the variation in write field across the thickness of the recording and non-uniformities in the write field gradient.

The uniformity in size and magnetic properties among the islands and the writability of the individual islands can be adversely affected by the etching process. Thus it is also important to be able to protect the individual magnetic layers in the islands during the etching process.

What is needed is a patterned perpendicular magnetic recording with uniform data islands having improved writability.

SUMMARY OF THE INVENTION

The invention relates to a patterned perpendicular magnetic recording medium with data islands that have first and second ferromagnetic layers (MAG1 and MAG2) with first and second nonmagnetic interlayers (IL1 and IL2) between MAG1 and MAG2. In one embodiment MAG1 and MAG2 may be similar CoPtCr alloys with similar thicknesses. IL1 is a metal film, like Ru or a Ru-based alloy like RuCr or RuCo with a thickness between about 0.1-1.5 nm, and IL2 is a metal oxide film, like an oxide of Ta, Ti, Nb, Si, Mn or Hf, with a thickness between about 0.2-1.0 nm. The thicknesses of IL1 and IL2 assure that MAG1 and MAG2 are strongly exchange coupled and exhibit a single switching behavior. If it is desirable to achieve a graded-anisotropy RL, MAG1 and MAG2 may have different amounts of Pt and Cr. In another embodiment, MAG2 is a "write assist" layer, for example a high-saturation magnetization, magnetically soft material like Co, CoPtCrB, CoPtCr alloys, NiFe alloys and CoFe alloys, in an exchange-spring structure. The thickness of IL1 may be made very thin so that IL2 functions as the coupling layer between MAG1 and the write-assist MAG2 layer. In still another embodiment for application to thermally-assisted recording (TAR), MAG2 is the chemically-ordered equiatomic binary alloy FePt or CoPt based on the $L1_0$ phase, or a pseudo-binary alloy based on the FePt $L1_0$ phase, e.g., (Fe(y)Pt(100−y))−X, with high magneto-crystalline anisotropy ($K_u$). In this TAR embodiment, IL1 is MgO, RuAl, or TiN and IL2 is $Ta_2O_5$, Ru, RuCo or Ru—$Ta_2O_5$.

In all of the embodiments an optional barrier layer (BL) may be formed on MAG2 to protect the underlying layers during subsequent etching to form the discrete islands. The BL may be formed of a metal, like Ru, W or Mo, or a metal oxide, like oxides of Hf, W or Mo, with a thickness between about 0.5 to 5 nm.

The proper choice of materials and thicknesses of IL1 and IL2 permits independent control of the microstructure of MAG2 from MAG1 and optimum tuning of the magnetic exchange coupling between MAG1 and MAG2, as well as control of the intergranular exchange coupling of MAG1. This results in improved island magnetic properties, as a result of the improved switching quality and film growth homogeneity. Thus a BPM with data islands according to the invention shows significantly reduced SFD, improved writability and a higher degree of magnetic homogeneity of the islands comprising the data zone.

For a fuller understanding of the nature and advantages of the present invention, reference should be made to the following detailed description taken together with the accompanying figures.

DETAILED DESCRIPTION OF THE INVENTION

Figure 1:
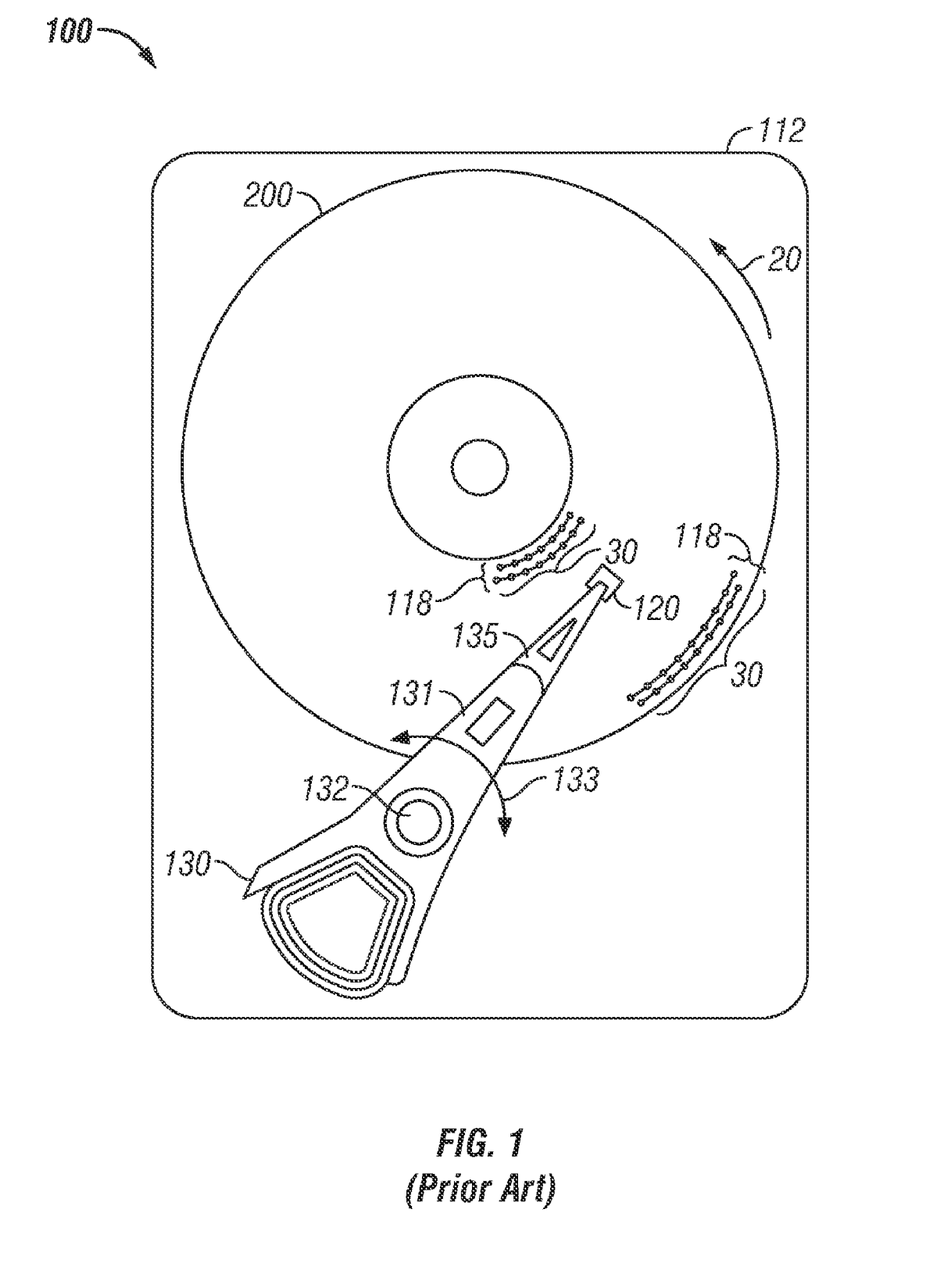
FIG. 1 is a top view of a perpendicular magnetic recording disk drive with bit-patterned media (BPM) and shows the patterned data islands arranged in concentric circular data tracks according to the prior art.

FIG. 1 is a top view of a patterned-media magnetic recording disk drive 100 with a patterned-media magnetic recording disk 200. The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. A magnetoresistive read head (not shown) and an inductive write head (not shown) are typically formed as an integrated read/write head patterned as a series of thin films and structures on the trailing end of the slider 120, as is well known in the art. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and read/write head associated with each surface of each disk.

The patterned-media magnetic recording disk 200 includes a hard or rigid disk substrate and discrete data islands 30 of magnetizable material on the substrate. The data islands 30 are arranged in radially-spaced circular tracks 118, with only a few islands 30 and representative tracks 118 near the inner and outer diameters of disk 200 being shown in FIG. 1. The islands 30 are depicted as having a circular shape but the islands may have other shapes, for example generally rectangular, oval or elliptical. As the disk 200 rotates in the direction of arrow 20, the movement of actuator 130 allows the read/write head on the trailing end of slider 120 to access different data tracks 118 on disk 200.

Figure 2:
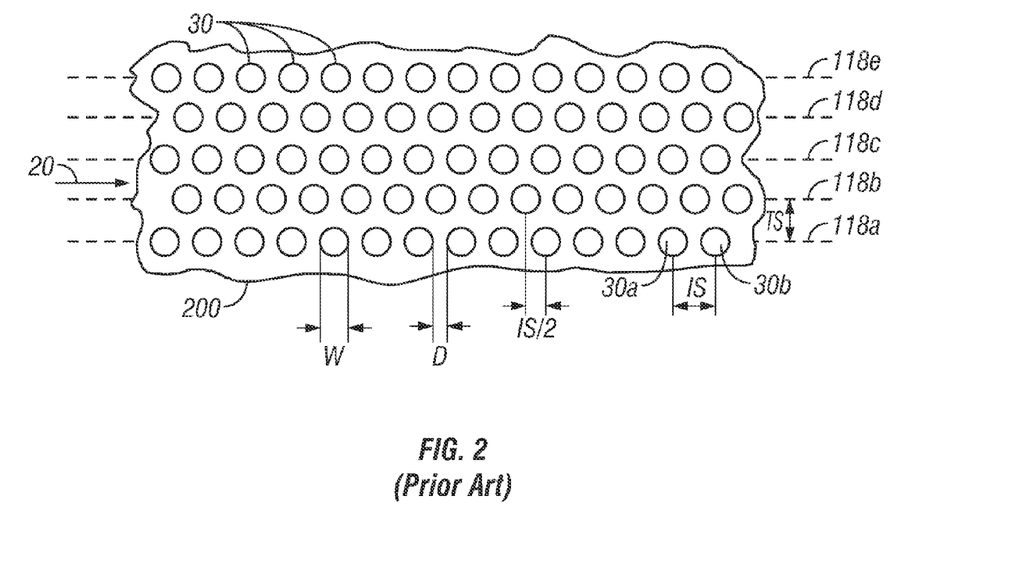
FIG. 2 is a top view of an enlarged portion of a prior art BPM disk showing the detailed arrangement of the data islands.

FIG. 2 is a top view of an enlarged portion of disk 200 showing the detailed arrangement of the data islands 30 on the surface of the disk substrate in one type of pattern according to the prior art. The islands 30 contain magnetizable recording material and are arranged in circular tracks spaced-apart in the radial or cross-track direction, as shown by tracks 118a-118e. The tracks are typically equally spaced apart by a fixed track spacing TS. The spacing between data islands in a track is shown by distance IS between data islands 30a and 30b in track 118a, with adjacent tracks being shifted from one another by a distance IS/2, as shown by tracks 118a and 118b. Each island has a lateral dimension W parallel to the plane of the disk 200, with W being the diameter if the islands have a circular shape. The islands may have other shapes, for example generally rectangular, oval or elliptical, in which case the dimension W may be considered to be the smallest dimension of the non-circular island, such as the smaller side of a rectangular island. The adjacent islands are separated by nonmagnetic regions or spaces, with the spaces having a lateral dimension D. The value of D may be greater than the value of W.

BPM disks like that shown in FIG. 2 may be perpendicular magnetic recording disks, wherein the magnetization directions are perpendicular to or out-of-the-plane of the recording layer in the islands. To produce the required magnetic isolation of the patterned data islands 30, the magnetic moment of the regions or spaces between the islands 30 must be destroyed or substantially reduced to render these spaces essentially nonmagnetic. The term "nonmagnetic" means that the spaces between the islands 30 are formed of a non-ferromagnetic material, such as a dielectric, or a material that has no substantial remanent moment in the absence of an applied magnetic field, or a magnetic material in a trench recessed far enough below the islands 30 to not adversely affect reading or writing. The nonmagnetic spaces may also be the absence of magnetic material, such as trenches or recesses in the magnetic recording layer or disk substrate.

Figure 3A:
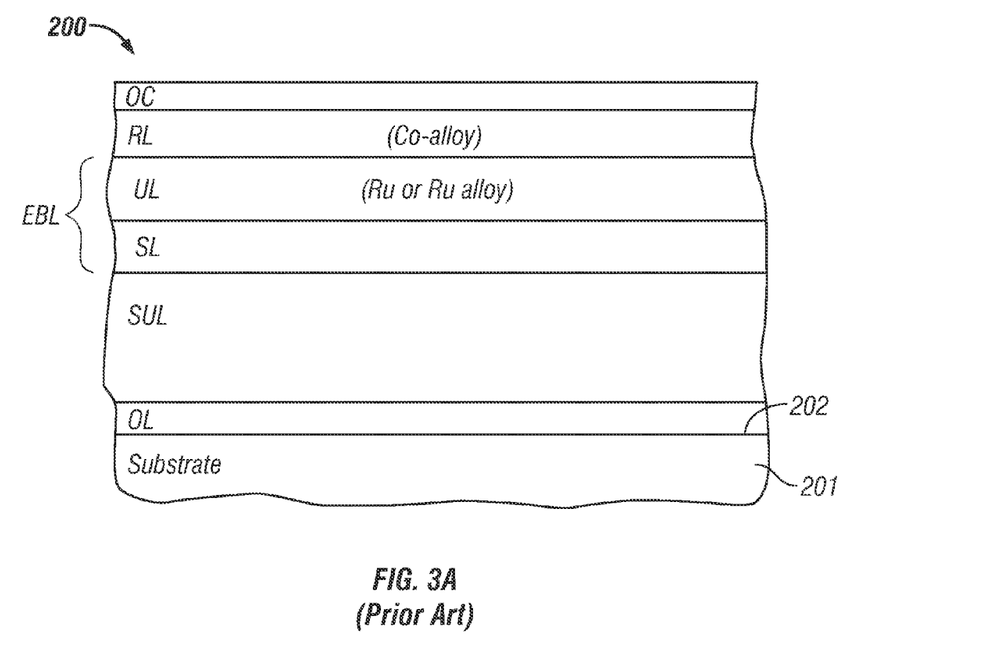
FIGS. 3A-3C are sectional views of a BPM disk at various stages of etching and planarizing the disk according to the prior art.

FIG. 3A is a sectional view showing the disk 200 according to the prior art before lithographic patterning and etching to form the BPM disk. The disk 200 is a substrate 201 having a generally planar surface 202 on which the representative layers are deposited, typically by sputtering. The disk 200 is depicted as a perpendicular magnetic recording disk with a recording layer (RL) having perpendicular (i.e., generally perpendicular to substrate surface 201) magnetic anisotropy and an optional soft magnetic underlayer (SUL) below the RL. The optional SUL serves as a flux return path for the magnetic write field from the disk drive write head.

The hard disk substrate 201 may be any commercially available glass substrate, but may also be a conventional aluminum alloy with a NiP surface coating, or an alternative substrate, such as silicon, canasite or silicon-carbide. An adhesion layer or onset layer (OL) for the growth of the SUL may be an AlTi alloy or a similar material with a thickness of about 2-10 nm that is deposited on the substrate surface 202.

The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

The RL in the discrete magnetic islands may be a cobalt (Co) alloy, like a cobalt-platinum (CoPt) or cobalt-platinum-chromium (CoPtCr) alloy. The Co alloy RL is grown on a growth-enhancing underlayer (UL) that induces the crystalline C-axis of the Co alloy to be perpendicular to the plane of the RL, so that the RL has strong perpendicular magnetocrystalline anisotropy. The UL may be a Ru or Ru alloy layer. A seed layer (SL), like a NiW or NiWCr alloy layer, may be deposited on the SUL to enhance the growth of the Ru-containing UL. If the optional SUL is present, then the UL and SL also function as an exchange-break layer (EBL) that breaks the magnetic exchange coupling between the magnetically permeable films of the SUL and the RL.

A protective overcoat (OC) is deposited on the RL. The OC may be sputter-deposited amorphous carbon, like DLC, which may also be hydrogenated and/or nitrogenated. Other materials that may be used for the OC include carbides such as silicon carbides and boron carbides; nitrides such as silicon nitrides ($SiN_x$), titanium nitrides, and boron nitrides; metal oxides, such as $TiO_2$, $ZrO_2$, $Al_2O_3$, $Cr_2O_3$, $Ta2O_5$ and $ZrO_2$—$Y_2O_3$; and mixtures of these materials.

The disk of FIG. 3A is lithographically patterned, for example by a nanoimprinting process. In nanoimprinting, a master template is fabricated, for example by direct e-beam writing, to have the desired pattern of data islands and non-magnetic regions. A thin film of imprint resist (i.e., a thermoplastic polymer) is spin coated onto the disk. Then the master template with its predefined pattern is brought into contact with the imprint resist film and the template and disk are pressed together and heat is applied. When the imprint resist polymer is heated above its glass transition temperature, the pattern on the template is pressed into the resist film. After cooling, the master template is separated from the disk and the patterned resist is left on the RL. The patterned imprint resist is then used as an etch mask. Reactive-ion-etching (RIE) or ion milling can be used to transfer the pattern in the imprint resist to the underlying disk to form the data islands and nonmagnetic regions.

Figure 3B:
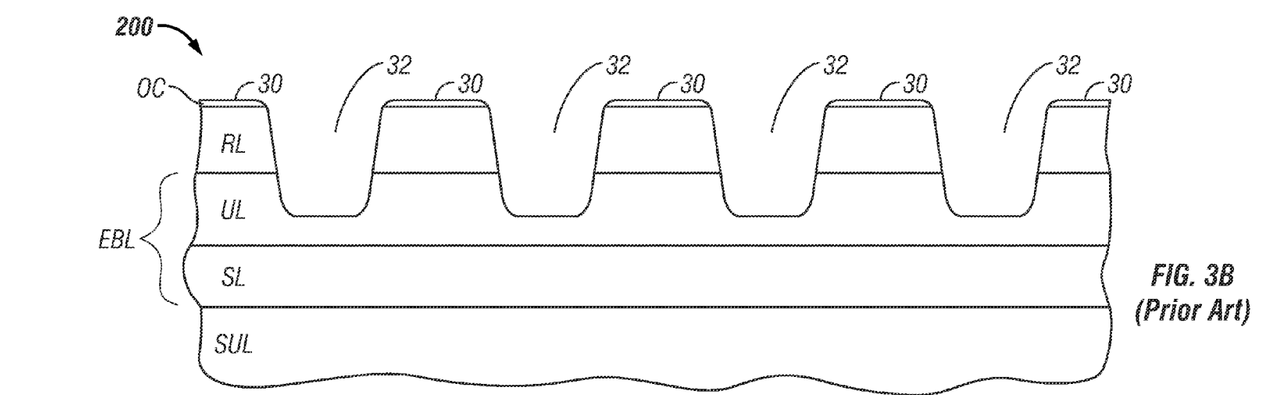

FIG. 3B is a sectional view of the disk 200 after lithographic patterning and etching. After etching, elevated lands 30 with RL material and grooves or recesses 32 are formed above the substrate surface 202. The typical depth of the recesses 32, which is also essentially the height of the lands 30, is in the range of about 4 to 50 nm and the typical width of the recesses is in the range of about 4 to 50 nm. As shown in FIG. 3B, the etching is preferably performed to a depth that removes all of the RL material so that there is no RL material in the recesses 32. The etching may remove a small amount of the EBL material. Typically there would be a layer of EBL material below the lower surface of the recesses 32.

Figure 3C:
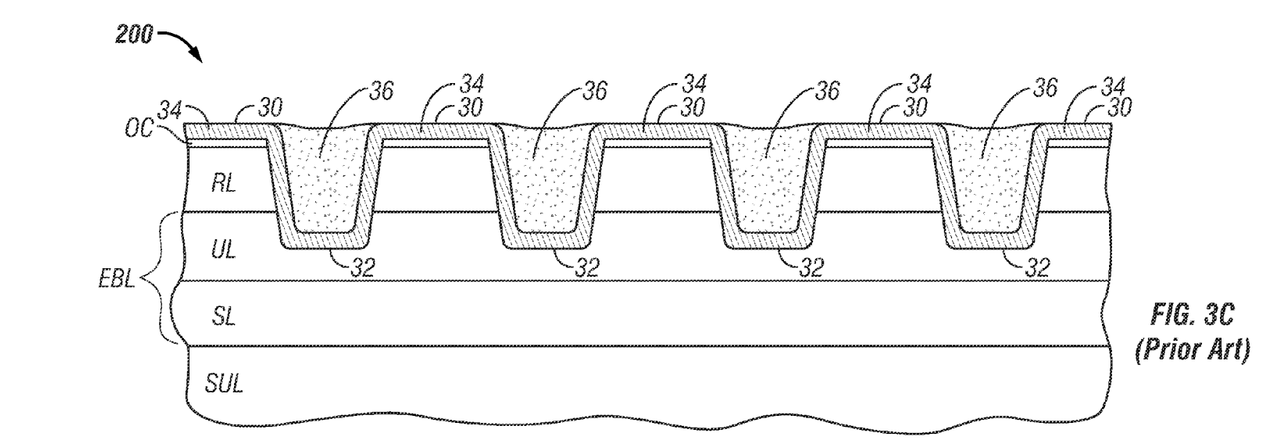

FIG. 3C is a sectional view of the etched disk 200 of FIG. 3B after deposition of a second optional protective overcoat 34 into the recesses 32 and over the tops of lands 30 and after deposition and chemical-mechanical-polishing (CMP) of fill material 36 in the recesses 32. The optional second protective overcoat 34 may be formed of one of the materials like that used for the OC directly on top of the RL. The fill material 36 may be $SiO_2$ or a polymeric material, or a nonmagnetic metal, like Cu. The CMP results in essentially a planarized disk surface. A layer of conventional liquid lubricant (not shown) may be deposited, for example by spin coating, on the surface of the disk 200.

Figure 4:
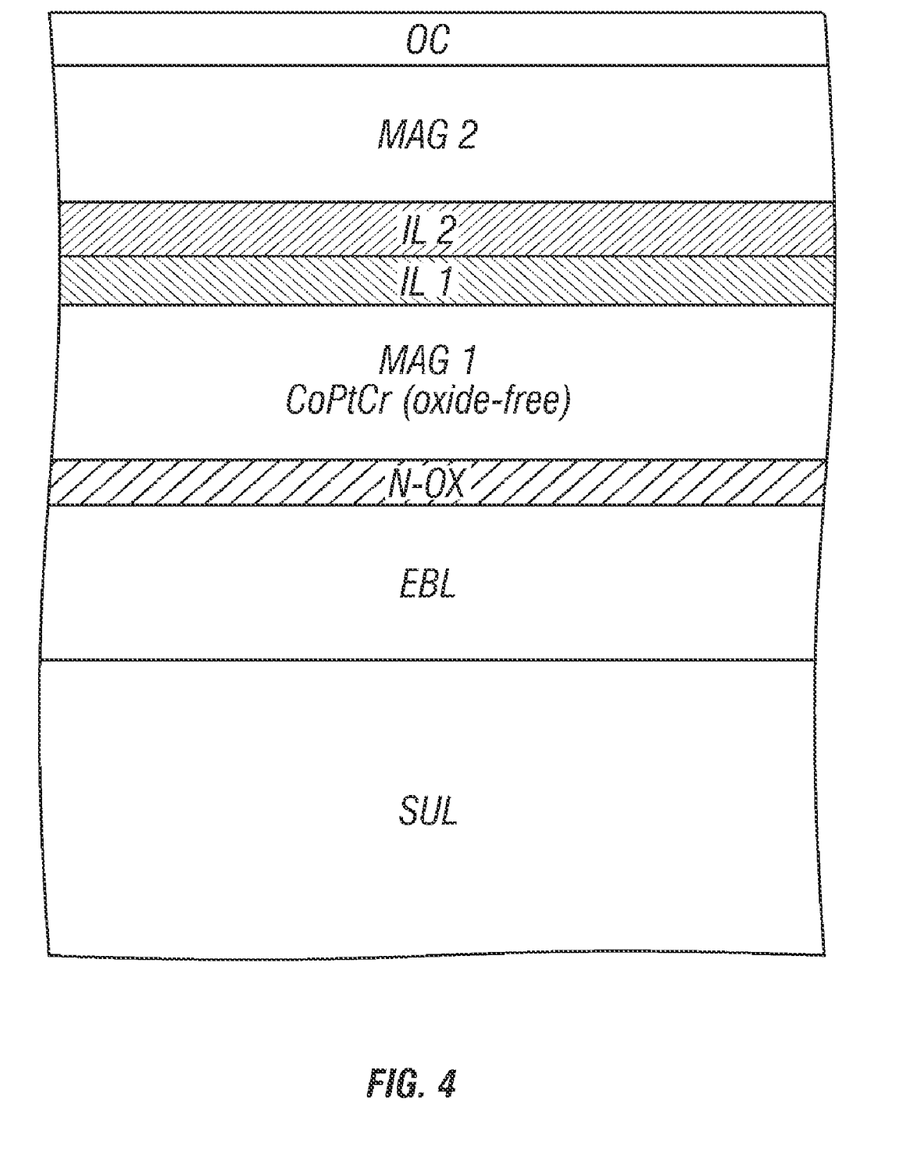
FIG. 4 is a sectional view of a portion of a disk structure according to the invention showing the various layers prior to patterning to form the discrete data islands.

FIG. 4 is a sectional view of a portion of a disk according to the invention prior to patterning into discrete islands. The disk substrate (not shown), the optional SUL, and the EBL may be as described in the prior art. The EBL may be a Ru or Ru alloy layer. The EBL is a nonmagnetic underlayer below the RL. If the disk is the type where there is no SUL, then there is a nonmagnetic underlayer, like Ru or a Ru alloy, on the substrate below the RL.

A first ultrathin or "nano" oxide film (N-OX) is deposited on the EBL (or nonmagnetic underlayer). The EBL may be a Ru or Ru alloy layer. The N-OX is preferably a Ta-oxide, like $Ta_2O_5$, but may also be a Ti-oxide or a Co-oxide, with a thickness in the range of about 0.1 to 1.5 nm. The N-OX is ultrathin, less than or equal to 1.5 nm, and preferably less than or equal to 0.7 nm. In this thickness regime, the thickness may be considered an "average" thickness of a discontinuous film. The Ta-oxide film may be deposited by sputter deposition from a $Ta_2O_5$ target. If the target is conducting, DC sputtering can be readily employed. On the other hand if the target is an insulator or a high resistance target, RF sputtering is the preferred mode. Alternatively, the $Ta_2O_5$ can be grown in situ by reactive sputtering of Ta with a sputter gas mixture containing the appropriate amount of oxygen.

A first ferromagnetic layer (MAG1) is deposited on N-OX. MAG1 is deposited on the N-OX. MAG1 is a Co alloy with perpendicular magnetic anisotropy, preferably an alloy comprising Co, Pt and Cr, with a thickness in the range of about 4 to 15 nm. The CoPtCr alloy has perpendicular magnetic anisotropy and may have a composition of $Co_xPt_yCr_z$, where the subscripts are in atomic percent; $50 \leq x \leq 85$; $7 \leq y \leq 30$; and $0 \leq z \leq 25$. The CoPtCr alloy may contain other elements, like Ta, typically in lesser amounts. Because the N-OX may be a discontinuous film, the surface onto which the Co-alloy MAG1 is deposited may be both the Ru or Ru alloy material of the N-OX and clusters or regions of N-OX. While granular Co-alloy magnetic layers for conventional continuous magnetic recording disks typically include an oxide, like $SiO_2$, to decrease the grain size, in this invention it is preferable that the Co-alloy be oxide-free and has a grain size as large as possible. A BPM disk with discrete islands having an oxide-free CoPtCr alloy layer formed on a N-OX is described in related pending application Ser. No. 13/049,124 filed Mar. 23, 2011.

In one embodiment of the disk according to the invention, a second ferromagnetic layer (MAG2) like MAG1 and with a similar thickness is located above MAG1, with first and second nonmagnetic interlayers (IL1 and IL2) between MAG1 and MAG2. IL1 and IL2 function as dual nucleation films between MAG1 and MAG2. IL1 is a metal film, preferably Ru or a Ru-based alloy like RuCr or RuCo with a thickness between about 0.1-1.5 nm. IL1 may also be a $Ru_xCo_{(100-x)}$ alloy, where x is between 30 and 70 at %. IL1 is sputter deposited on MAG1 at low pressure (less than about 10 mTorr). IL2 is a metal oxide film, preferably an oxide of Ta but also an oxide of Ti, Nb, Si, Mn or Hf, with a thickness between about 0.2-1.0 nm. IL2 is sputter deposited on IL1 at high pressure (greater than about 20 mTorr). MAG2 is sputter deposited directly on IL2. IL1 may be just thick enough to form as a generally conformal film on MAG1. But in the ultrathin thickness regime, the thickness of each of IL1 and IL2 may be an "average" thickness of a discontinuous film, with the IL1 and IL2 material formed as discontinuous clusters. Thus if IL1 is generally conformal and IL2 is discontinuous, then MAG2 is grown on the IL2 clusters as well as on portions of the underlying IL1. IL1 is deposited at relatively low sputtering pressure (less than about 10 mTorr) to encourage formation of a conformal Ru film or Ru-based alloy clusters on MAG1. IL2 is deposited at high sputtering pressure to encourage the formation of metal oxide clusters. Thus the material of MAG2 is in contact with clusters of IL2 material and IL1 material which jointly control the microstructure of MAG2. MAG2 and MAG1 together function as the RL. The thicknesses of IL1 and IL2 assure that MAG1 and MAG2 are strongly exchange coupled and exhibit a single switching behavior. If it is desirable to achieve a graded-anisotropy RL, MAG1 and MAG2 will typically have different amounts of Pt and Cr. For example, MAG2 may have more Pt and less Cr and thus a higher anisotropy than MAG1. A graded-anisotropy RL compensates for the variation in write field across the thickness of the RL and non-uniformities in the write field gradient. The total thickness of MAG1 and MAG2 may be adjusted to achieve microstructural control of MAG2 by MAG1, to select the desired magnetic moment and anisotropy of MAG1+MAG2, and to match the writing characteristics of write head.

In another embodiment of the invention, MAG2 is a "write assist" layer and IL1 and IL2 are as described above, i.e., a metal film, preferably Ru or a Ru-based alloy, and a metal oxide film, like $Ta_2O_5$, respectively. MAG2 may be a Co, a CoPtCr alloy or a CoPtCr-oxide, with a thickness between 0.5 to 10 nm. MAG2 is for example a high-saturation magnetization (Ms greater than about 600 emu/cm$^3$) magnetically soft material (coercivity less than about 2000 Oe) which through a spring switching mechanism improves the writability of MAG1. Examples of such layers include Co, Fe, CoPtCr alloys, CoPtCrB, NiFe, and CoFe alloys. In another implementation of such a write assist structure, the thickness of IL1 is reduced (to a thickness between about 0.1 to 3 nm) so that IL2 functions as the coupling layer of an exchange spring type of recording structures. IL2 in this case is preferably Ru, RuCo (Co=30 to 60 atomic %) or Ru—$Ta_2O_5$ (Ta oxide=1 to 25 atomic %).

The proper choice of materials and thicknesses of IL1 and IL2 permits independent control of the microstructure of MAG2 from MAG1 and optimum tuning of the magnetic exchange coupling between MAG1 and MAG2, as well as control of the intergranular exchange coupling of the recording layer (MAG1). This results in improved island magnetic properties, as a result of the improved switching quality and film growth homogeneity. Thus a BPM with data islands according to the invention shows significantly reduced SFD, improved writability and a higher degree of magnetic homogeneity of the islands comprising the data zone.

Perpendicular magnetic recording disks with BPM have been proposed primarily for use in conventional magnetic recording, wherein an inductive write head alone writes data to the islands. However, perpendicular BPM disks have also been proposed for use in heat-assisted recording, also called thermally-assisted recording (TAR). In a TAR system, an optical waveguide with a near-field transducer (NFT) directs heat from a radiation source, such as a laser, to heat localized regions of the magnetic recording layer on the disk. A TAR system allows the use of magnetic materials with high magneto-crystalline anisotropy ($K_u$) to increase the thermal stability of the recording layer. However, increasing $K_u$ also increases the short-time switching field ($H_0$) of the recording layer, which is the field required to reverse the magnetization direction. For most magnetic materials $H_o$ is substantially greater, but directly related to, the coercive field or coercivity FL measured on much longer time-scales. Thus the write field alone (which is typically no greater than about 12 kOe from conventional inductive write heads) is insufficient to switch the magnetization. However, the radiation from the NFT heats the high-$K_u$ magnetic material locally, in some cases to near or above its Curie temperature, to reduce the coercivity and lower the switching field enough for writing to occur by the inductive write head.

Figure 5:
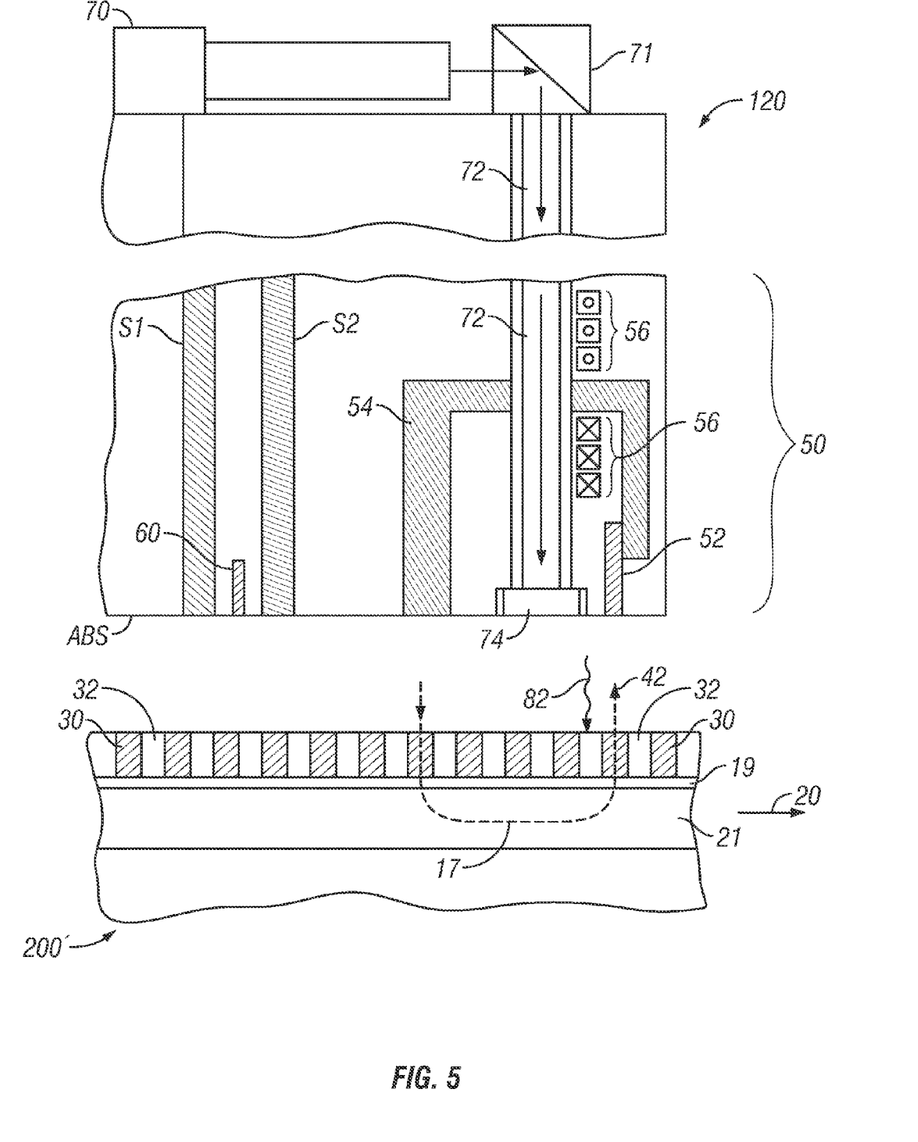
FIG. 5 is a sectional view of an air-bearing slider for use in a thermally-assisted recording (TAR) system and a portion of a TAR disk with data islands according to the invention.

Previously-described FIG. 1 thus depicts a conventional magnetic recording system with a perpendicular BPM disk 200 and an air-bearing slider 120 that supports the write head and read head. FIG. 5 depicts a sectional view, not drawn to scale because of the difficulty in showing the very small features, of an air-bearing slider 120' for use in a TAR system and a portion of a TAR disk 200'. The air-bearing slider 120' supports the write head 50 (with yoke 54 and write pole 52), read head 60, and shields S1 and S2. In the TAR disk 200', a heat sink layer 21 is located below the islands 30 and non-magnetic regions 32. The islands 30 may be islands according to this invention, like the island in FIG. 4. Heat sink layer 21 is formed of a material that is a good thermal conductor, like Cu or CuZr, Au, Ag or other suitable metals or metal alloys. Layer 19 may be a thermal resist layer, such as a layer of MgO or $SiO_2$, between the heat sink layer 21 and the islands 30 to help control the heat flow so that heat is not distributed too rapidly into the heat sink layer 21. The TAR disk 200' may also include an optional SUL, which if present would be located below the heat sink layer 21. If there is no SUL, then there is no need for an EBL. The slider 120' has an air-bearing surface (ABS) that faces the disk 200'. The slider 120' also supports a laser 70, mirror 71, optical waveguide or channel 72 and NFT 74, which has its output at the ABS.

When write-current is directed through coil 56, the write pole 52 directs magnetic flux to the data islands 30, as represented by arrow 80 directed to one of the data islands 30. The dashed line 17 with arrows shows the flux return path back to the return pole 54. The NFT 74 directs near-field radiation, as represented by wavy arrow 82, to the data islands 31 as the TAR disk 10' moves in the direction 23 relative to the slider. The electric charge oscillations in the NFT heat the data islands 30 at the same time the data islands are exposed to the write field from the write pole 52. This raises the temperature of the magnetic recording material in the data islands to thereby lower the coercivity of the material and enable the magnetization of the data island to be switched by the write field.

Thus in other embodiments of the BPM disk according to the invention, the BPM disk is a TAR disk usable in a TAR disk drive. In a first TAR disk embodiment, the disk structure may be like that shown in FIG. 4, with the same MAG1, IL1 and IL2 as described above, but wherein MAG2 is formed of a high-anisotropy CoPtCr alloy material. Depending on the specific composition, a high-$K_u$ CoPtCr alloy may have a switching field up to about 20 kOe. The NFT must reduce the coercivity of MAG2 enough so that the switching field of MAG2 is reduced to a value significantly below the write field. The composition of the MAG2 CoPtCr alloy layer may be varied to allow tuning of the Curie temperature.

In a second TAR disk embodiment, the disk structure may be like that shown in FIG. 4, with the same MAG1, but with different materials for IL1 and IL2, and with a chemically-ordered high-$K_u$ alloy as MAG2. IL1 is MgO or RuAl (Al=30 to 70 atomic %) or TiN (N=40 to 60 atomic %) with a thickness in the range of 0.1 to 2 nm. IL2 is $Ta_2O_5$, Ru, RuCo (Co=30 to 70 atomic %) or Ru—$Ta_2O_5$ (Ta oxide=1 to 25 atomic %) with a thickness in the range of 0.1 to 1 nm. MAG2 is preferably the chemically-ordered equiatomic binary alloy FePt or CoPt based on the $L1_0$ phase. Chemically-ordered alloys of FePt and CoPt (and FePd and CoPd) ordered in $L1_0$ are known for their high magneto-crystalline anisotropy and magnetization, properties that are desirable for high-density magnetic recording materials. The chemically-ordered FePt or CoPt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The chemically-ordered FePt (or CoPt) alloy layer may also be a pseudo-binary alloy based on the FePt $L1_0$ phase, e.g., (Fe(y)Pt(100−y))−X, where y is between about 45 and 55 atomic percent and the element X may be Ni, Au, Cu, Pd or Ag and is present in the range of between about 0% to about 20% atomic percent. While the pseudo-binary alloy FePt—X in general has similarly high anisotropy as the binary alloy FePt, it allows additional control over the magnetic and structural properties of MAG2. If MAG2 is the chemically-ordered FePt alloy layer it is sputter deposited onto IL2 structure while the disk substrate is maintained at an elevated temperature, above 300° C. and preferably above 450° C. The high-temperature deposition assures that the high switching field can be achieved. The switching field is preferably between about 30 and 150 kOe. The temperature of the disk substrate can be gradually decreased during the deposition, for example from a starting temperature of about 600° C. to a final temperature of about 300° C., to provide a FePt alloy layer with a graded anisotropy, with the anisotropy decreasing with increasing thickness.

Figure 6:
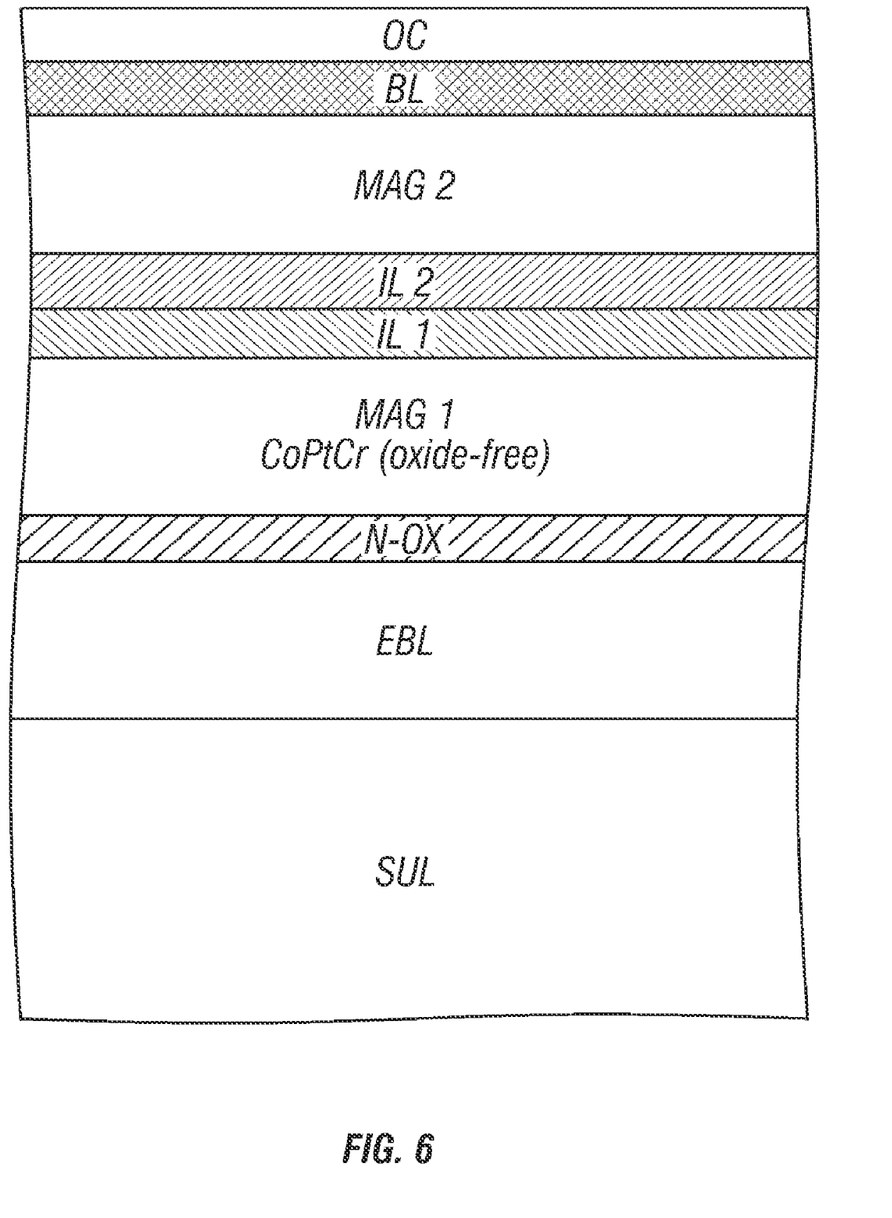
FIG. 6 is a sectional view of a portion of a disk structure according to the invention showing the various layers, including an optional barrier layer, prior to patterning to form the discrete data islands.

FIG. 6 is a sectional view of a portion of a disk according to the invention prior to patterning into discrete islands and with an optional barrier layer (BL) on MAG2. The BL protects the underlying layers during subsequent etching to form the discrete islands. The BL may be formed of a metal, like Ru, W or Mo, or a metal oxide, like oxides of Hf, W or Mo or other low etch rate materials such as a silicon nitride ($SiN_x$). The BL may have a thickness between about 0.5 to 5 nm.

Figure 7:
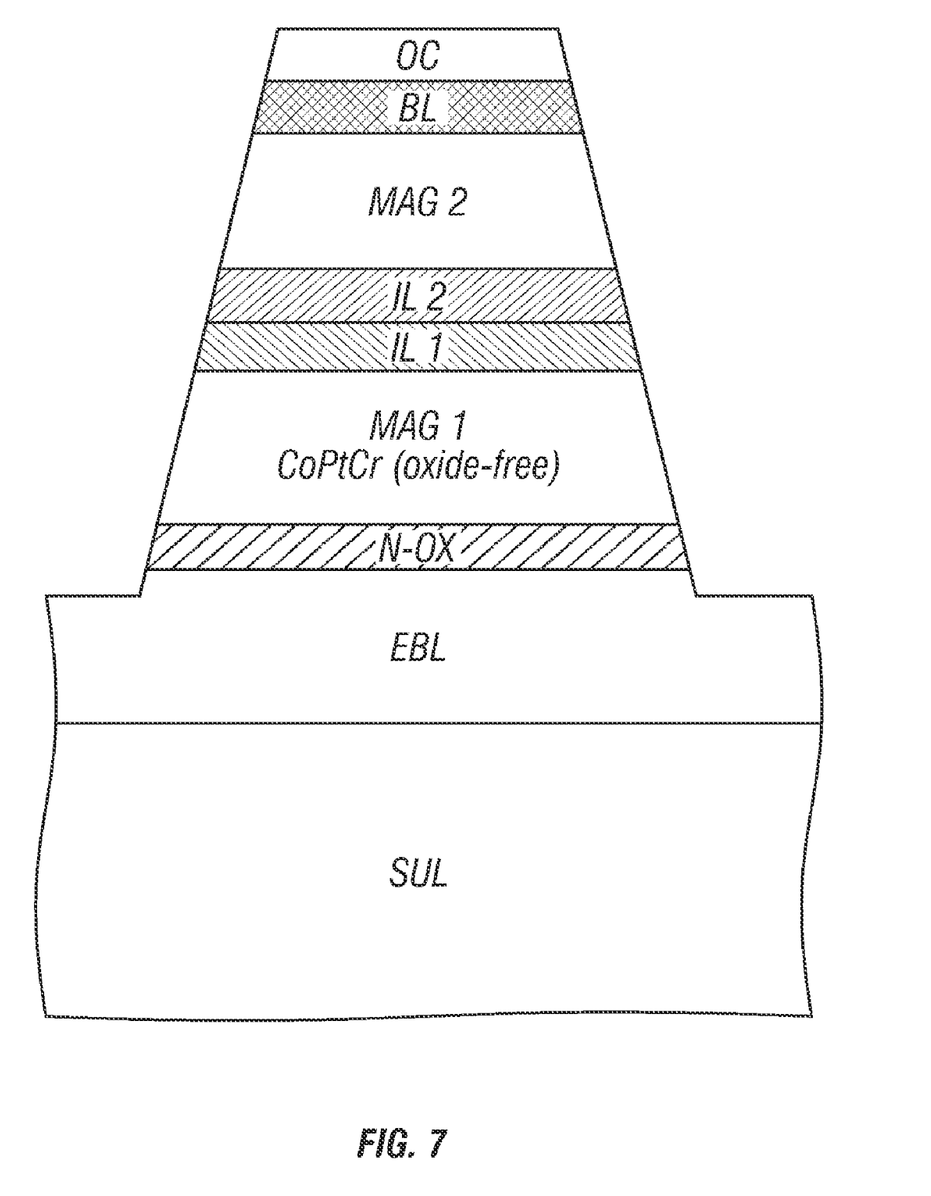
FIG. 7 is a sectional view of a portion of the disk structure according to the invention after patterning showing a single data island.

FIG. 7 is a sectional view of a portion of the BPM disk according to the invention showing a single data island after lithographic patterning and etching. The etching is preferably performed to a depth that removes all of the MAG1 material. The etching may remove a small amount of the EBL material. Typically there would be a layer of EBL material below the lower surface of the recesses between the data islands.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned perpendicular magnetic recording medium comprising:
    a substrate;
    a nonmagnetic underlayer on the substrate;
    a first ferromagnetic layer (MAG1) having perpendicular magnetic anisotropy, the first ferromagnetic layer being an oxide-free alloy comprising cobalt, platinum and chromium;
    a first nonmagnetic interlayer (IL1) on the first ferromagnetic layer, wherein said IL1 comprises a material selected from Ru and a Ru-based alloy and has a thickness greater than or equal to 0.1 nm and less than or equal to 1.5 nm;
    a second nonmagnetic interlayer (IL2) on said IL1, wherein said IL2 comprises one or more oxides of an element selected from the group consisting of Ta, Nb, Ti, Si, Mn, and Hf and has a thickness greater than or equal to 0.2 nm and less than or equal to 1.0 nm; and
    a second ferromagnetic layer (MAG2) on said IL2; and
    wherein said MAG1, said IL1, said IL2 and said MAG2 are patterned into a plurality of discrete islands.

2. The medium of claim 1 wherein said MAG2 is an oxide-free alloy having perpendicular magnetic anisotropy and comprising Co, Pt and Cr; and wherein said MAG2 and said MAG1 are exchange-coupled across said IL1 and said IL2.

3. The medium of claim 2 wherein said MAG2 has more Pt and less Cr than said MAG1.

4. A patterned perpendicular magnetic recording medium comprising:
    a substrate;
    a nonmagnetic underlayer on the substrate;
    a first ferromagnetic layer (MAG1) having perpendicular magnetic anisotropy, the first ferromagnetic layer being an oxide-free alloy comprising cobalt, platinum and chromium;
    a first nonmagnetic interlayer (IL1) on the first ferromagnetic layer;
    a second nonmagnetic interlayer (IL2) on said IL1; and
    a second ferromagnetic layer (MAG2) on said IL2, wherein said MAG2 is a write-assist layer formed of a material selected from Co, Fe, CoPtCr alloys, CoPtCrB, NiFe and CoFe alloys and having a saturation magnetization greater than 600 emu/$cm^3$ and a coercivity less than 2000 Oe; and
    wherein said MAG1, said IL1, said IL2 and said MAG2 are patterned into a plurality of discrete islands.

5. A patterned perpendicular magnetic recording medium comprising:
    a substrate;
    a nonmagnetic underlayer on the substrate;
    a first ferromagnetic layer (MAG1) having perpendicular magnetic anisotropy, the first ferromagnetic layer being an oxide-free alloy comprising cobalt, platinum and chromium;
    a first nonmagnetic interlayer (IL1) on the first ferromagnetic layer;
    a second nonmagnetic interlayer (IL2) on said IL1; and
    a second ferromagnetic layer (MAG2) on said IL2;
    wherein said MAG1, said IL1, said IL2 and said MAG2 are patterned into a plurality of discrete islands; and
    wherein said MAG2 and said MAG1 are an exchange-spring structure, wherein said IL has a thickness between about 0.1 to 3 nm, and wherein said IL2 is the exchange-spring coupling layer formed of a material selected from Ru, RuCo, where Co is greater than or equal to 30 atomic % and less than or equal to 60 atomic % and Ru—$Ta_2O_5$, where Ta-oxide is greater than or equal to 1 atomic % and less than or equal to 25 atomic %.

6. The medium of claim 1 wherein said IL2 consists essentially of an oxide of Ta.

7. The medium of claim 1 wherein said IL2 is a discontinuous film of oxide clusters on said IL1, wherein said MAG2 is in contact with said IL1 and the oxide clusters of said IL2.

8. The medium of claim 1 wherein said IL1 is a conformal film of said IL1 material on said MAG1.

9. The medium of claim 1 wherein said IL1 is a discontinuous film of said IL1 material on said MAG1.

10. A patterned perpendicular magnetic recording medium comprising:
    a substrate;
    a nonmagnetic underlayer on the substrate;
    a first ferromagnetic layer (MAG1) having perpendicular magnetic anisotropy, the first ferromagnetic layer being an oxide-free alloy comprising cobalt, platinum and chromium;
    a first nonmagnetic interlayer (IL1) on the first ferromagnetic layer;
    a second nonmagnetic interlayer (IL2) on said IL1; and a second ferromagnetic layer (MAG2) on said IL2, wherein said MAG2 is a chemically-ordered alloy selected from a FePt alloy, a CoPt alloy, a FePt—X alloy and a CoPt—X alloy, where the element X is selected from the group consisting of Ni, Au, Cu, Pd and Ag and is present in an amount less than or equal to 20 atomic percent; and wherein said MAG1, said IL1, said IL2 and said MAG2 are patterned into a plurality of discrete islands.

11. The medium of claim 10 wherein said MAG2 has a switching field greater than or equal to 30 kOe.

12. The medium of claim 10 wherein said IL1 is selected from MgO and RuAl, where Al is greater than or equal to 30 atomic % and less than or equal to 70 atomic %.

13. The medium of claim 12 wherein said IL2 is selected from $Ta_2O_5$, Ru, RuCo, where Co is greater than or equal to 30 atomic % and less than or equal to 70 atomic % and Ru—$Ta_2O_5$, where Ta-oxide is greater than or equal to 1 atomic % and less than or equal to 25 atomic %.

14. A patterned perpendicular magnetic recording medium comprising:
a substrate;
a nonmagnetic underlayer on the substrate;
a first ferromagnetic layer (MAG1) having perpendicular magnetic anisotropy, the first ferromagnetic layer being an oxide-free alloy comprising cobalt, platinum and chromium;
a first nonmagnetic interlayer (IL1) on the first ferromagnetic layer;
a second nonmagnetic interlayer (IL2) on said IL1;
a second ferromagnetic layer (MAG2) on said IL2;
a barrier layer (BL) on said MAG2; and
a protective overcoat (OC) on said BL; and
wherein said MAG1 said IL1, said IL2 and said MAG2 are patterned into a plurality of discrete islands, and wherein said BL has a thickness greater than or equal to 0.5 nm and less than or equal to 5 nm and is selected from Ru, W, Mo, an oxide of Hf, W or Mo, and a silicon nitride.

15. A patterned perpendicular magnetic recording medium comprising:
a substrate;
a nonmagnetic underlayer on the substrate;
a first ferromagnetic layer (MAG1) having perpendicular magnetic anisotropy, the first ferromagnetic layer being an oxide-free alloy comprising cobalt, platinum and chromium;
a nano-oxide film (N-OX) between the nonmagnetic underlayer and said MAG1, said N-OX comprising an oxide selected from a Ta-oxide, a Co-oxide and a Ti-oxide and having a thickness greater than or equal to 0.1 nm and less than or equal to 1.5 nm;
a first nonmagnetic interlayer (IL1) on the first ferromagnetic layer;
a second nonmagnetic interlayer (IL2) on said IL1;
a second ferromagnetic layer (MAG2) on said IL2; and
wherein said MAG1 said IL1, said IL2 and said MAG2 are patterned into a plurality of discrete islands.

16. The medium of claim 1 further comprising a soft underlayer (SUL) of soft magnetically permeable material on the substrate below the underlayer, the SUL comprising a material selected from the group consisting of alloys of CoFe, CoNiFe, NiFe, FeCoB, CoCuFe, FeAlSi, FeTaN, FeN, FeTaC, CoTaZr and CoZrNb.

17. A magnetic recording disk drive comprising:
the medium of claim 1;
a write head for magnetizing said MAG1 in the data islands; and
a read head for reading the magnetized data islands.

18. A thermally-assisted recording (TAR) magnetic recording disk drive comprising:
the medium of claim 11;
a write head for applying a magnetic write field to the data islands to magnetize said MAG2 in the data islands, the write head providing a write field less than 30 kOe;
an optical data channel and near-field transducer for directing radiation to the data islands to heat said MAG2; and
a read head for reading the data islands with said magnetized MAG2.

* * * * *